United States Patent [19]

Ciboulet et al.

[11] 4,306,118
[45] Dec. 15, 1981

[54] TELEPHONE SET RINGING CURRENT INJECTION DEVICE

[75] Inventors: Michel Ciboulet, Argenteuil; Jean L. Belly, Vincennes; Antoine Malo-Huerto, Montlignon, all of France

[73] Assignee: Le Materiel Telephonique Thomson-CSF, Paris, France

[21] Appl. No.: 75,721

[22] Filed: Sep. 14, 1979

[30] Foreign Application Priority Data

Sep. 19, 1978 [FR] France .............................. 78 26823

[51] Int. Cl.³ .......................................... H04M 3/02
[52] U.S. Cl. ............................. 179/84 A; 179/18 HB
[58] Field of Search ................. 179/84 R, 84 A, 18 F, 179/18 FA, 18 HB, 51 AA

[56] References Cited

U.S. PATENT DOCUMENTS

| | | | |
|---|---|---|---|
| 3,829,619 | 8/1974 | Close et al. | 179/18 HB |
| 3,917,909 | 11/1975 | Macrander et al. | 179/18 HB |
| 4,001,516 | 1/1977 | Weisigk et al. | 179/84 R |

Primary Examiner—Bernard Konick
Assistant Examiner—J. A. Popek
Attorney, Agent, or Firm—Roland Plottel

[57] ABSTRACT

A telephone set line circuit ringing current injection device having a hybrid circuit in which each feed wire is connected in series with a resistor, and a stage consisting of a diode connected in parallel with the collector-to-emitter circuit of a transistor. The cathode of one diode is connected to the collector of the transistor on the side of one of the feed wires, the anode of the other diode and the emitter of the other transistor are connected to the other wire.

3 Claims, 3 Drawing Figures

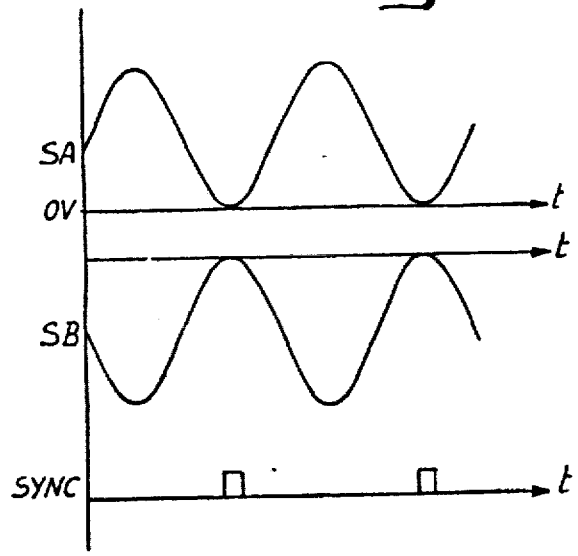
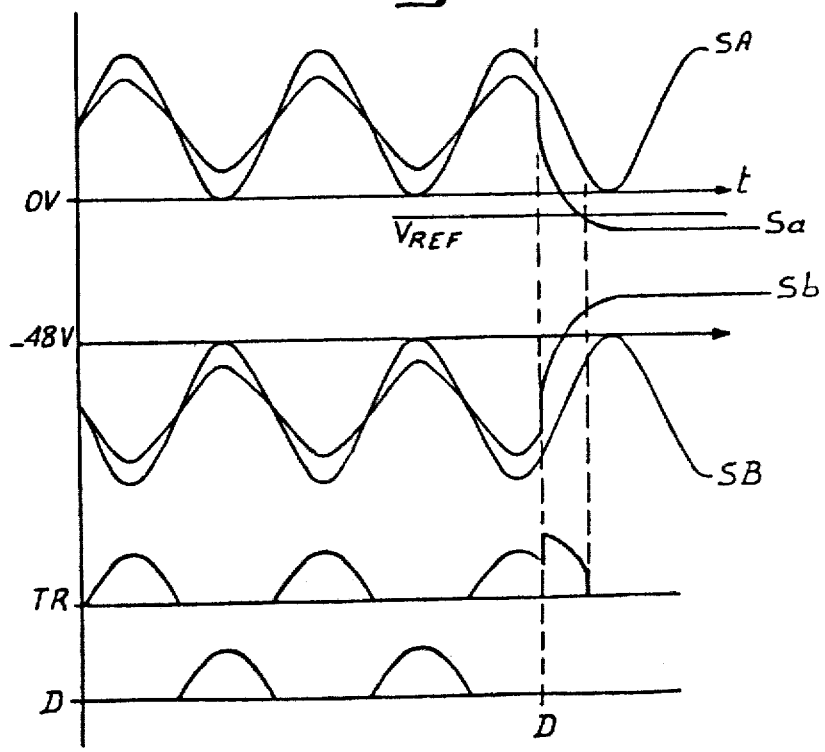

TELEPHONE SET RINGING CURRENT INJECTION DEVICE

BACKGROUND OF THE INVENTION

The present invention relates to new devices for injecting current into the line circuit of a telephone set and more particularly a hybrid injection circuit associated with a closed-loop detector. The new devices proposed by the present invention may be used advantageously in entirely electronic telephone exchange systems where, by means of thorough miniaturization, the operator's console contains all equipment formly placed in the desk and racks. Such concentration into a single console requires both miniaturization and the elimination of noise. In addition, the use made of electronics requires in certain cases small electrical order currents.

The subject of the present invention is a ringing current injection device having the following advantages: miniaturization, especially of the hybrid circuit, integration of the ringing current injector and protective resistors on this hybrid circuit, the elimination of switching relay noise by the use of electronics, and the considerable reduction of the current compared with that controlling earlier devices.

The purpose of the device according to the invention is to inject ringing current into the telephone set line when the order to do so is received by the central unit and depending on the status of the called telephone set, with interruption of this ringing current if the telephone set goes off-hook. This device therefore consists essentially of a circuit constituted around a central ringing current control component fed with signals from the central unit and closed-loop detector. This circuit is entirely electronic.

In order to explain more easily the technical characteristics and advantages of the present invention, a practical example is described below, it being understood that this example is not limiting with regard to its implementation and any possible applications.

BRIEF DESCRIPTION OF THE DRAWINGS

The description refers to the appended drawing in which:

FIGS. 2a and 2b show the wave-forms and signals as a function of time.

DESCRIPTION OF THE PREFERRED EMBODIMENTS

Figure 1:
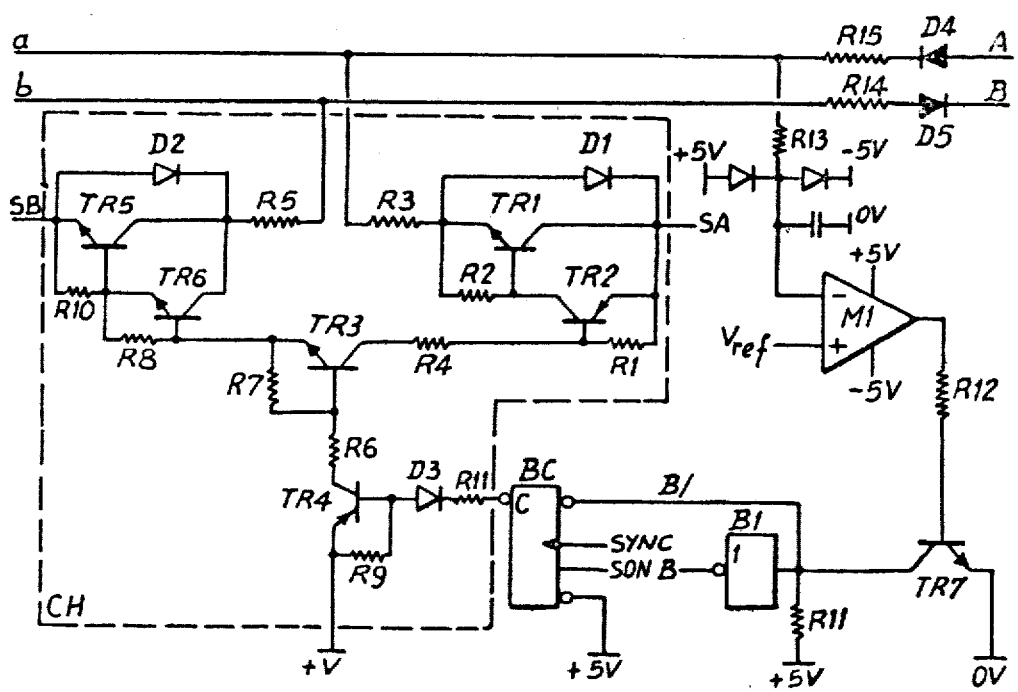
FIG. 1 is a diagram of a circuit in accordance with the invention.

In FIG. 1, the subscriber's set (not shown) is connected to lines a and b, and is fed with DC (by a device not shown) from AB via the two resistors R14 and R15, preferably 300 ohms, and two diodes D4 and D5.

The line-loop detector based on comparator M1 is shown to the right of the ringing current control central flip-flop BC, whilst the ringing current injection hybrid circuit CH (outlined with a dashed line) fed from SA and SB by the ringing generator (not shown) is shown to the left of this flip-flop. The control orders from the control terminal C of the central flip-flop BC pass via resistor R11 and a diode D3 in a control circuit comprising the two transistors TR3 and TR4, the resistors R6, R7 and R9 and the source of positive voltage +V. The emitter of TR3 is connected to its base by resistor R7, and the base of TR3 is connected to the collector of TR4 via resistor R6. The emitter of TR4 is connected to its base via resistor R9. The source +V is connected to the emitter of TR4, whose base is connected to the anode of D3. When the voltage on C and the voltage +V allow (depending on the state of flip-flop BC), an emitter-to-collector current passes through TR4, switching on transistor TR3 via R6. This control circuit is connected to two other components constituting the power stage of the hybrid injection circuit (CH), organized around transistors TR1 and TR2 and also TR5 and TR6. These two pairs of transistors are connected in a Darlington circuit, transistor TR2 controlling transistor TR1, and transistor TR6 controlling transistor TR5. The emitter of TR3 is directly connected to the base of TR6 and is connected via a resistor R4 to the base of TR2. The bases of transistors TR1, TR2, TR5 and TR6 are connected to the emitters of these same transistors via resistors R2, R1, R10 and R8 respectively.

The ringing current generator is connected to terminals SA and SB. Terminal SA is connected to the emitter of TR2, the collector of TR1 and the cathode of a diode D1, whilst terminal SB is connected to the emitter of TR5 and the anode of a diode D2.

The telephone set wire a is connected via resistor R3 to the emitter of TR1 and the anode of diode D1.

The telephone set wire b is connected via resistor R5 to the cathode of diode D2, the collector of TR5 and the collector of TR6.

The Darlington circuit containing the pairs of transistors TR1-TR2 and TR5-TR6 has, as is well known, the advantage of high current gain, the gain of each pair being the product of the gains of each transistor.

The connection of the power transistors TR1 and TR5 in parallel with diodes D1 and D2 constitutes two bidirectional static switches controlling the passage of the ringing currents from SA and SB to a and b. When TR3 is switched on as described above, it switches on in cascade TR2 and TR6 and then TR1 and TR5, thereby letting through the ringing current. In this manner, as soon as the voltage on C of flip-flop BC allows, the ringing current is injected into wires a and b. Diodes D4 and D5 prevent the ringing voltages SA and SB from being applied to the telephone set DC supply circuit connected to A and B when the telephone set a,b is rung.

The central flip-flop BC is fed with three types of signal described later, including in particular a resetting signal B/ from the loop detector. The latter consists essentially of a comparator M1. The positive input of M1 is connected to a reference voltage $V_{REF}$ mentioned below, whilst its negative input is connected to the telephone set wire a via a resistor R13. The negative input of M1 is also connected to two protective diodes connected between the +5 and −5 V supplies and to a capacitor eliminating interference. The comparator constituted by M1 is fed with −5 V and +5 V, and its output is connected via resistor R12 to the base of transistor TR7. Its emitter is grounded, whilst its collector is connected to the flip-flop B1 and to one input of the central flip-flop BC, as well as to the +5 V supply via resistor R11. When the subscriber's set is on-hook, the potential on wire a is 0 V, this exceeding the selected reference voltage $V_{REF}$. The output of comparator M1 is −5 V and TR7 is cut off. When the subscriber lifts his receiver, the current flows in the line and the potential of a becomes negative (approximately −10 V). This voltage, less than $V_{REF}$, changes the output of M1 to +5 V and TR7 is saturated. Flip-flop B1 applies signal B to the central unit, not shown in the figure, which thus notes the off-hook condition and dialling. In addition, if the called telephone set is on-hook, the voltage on wire a becomes constantly positive and TR7 remains cut off. A constant signal B indicates that the telephone set is on-hook. If the called telephone set receiver is lifted, the voltage on wire a becomes negative, comparator M1 switches and TR7 saturates. Signal B thus indicates that the telephone set is off-hook and signal B/ resets the ringing current injector control signal by means of the flip-flop BC, thus automatically interrupting the ringing current.

With regard to the central control flip-flop BC, it is fed with the ringing order from the central unit not shown in the figure (order on SON). The synchronization signal is received on SYNC, validating the ringing current order when the voltage on a is zero or 0 V.

When the receiver of the called telephone set is lifted, signal B/ resets the central flip-flop BC to "0" and cancels the injection order C. In the rest condition, the output of flip-flop BC is a logical "1". Transistor TR4 and therefore transistors TR1, TR2, TR3, TR5 and TR6 are cut off.

In FIG. 2A, it is seen that the synchronization signal SYNC appears each time SA is zero, SB passing through −48 V DC and SA and SB being the voltages on terminals SA and SB connected to the ringing current generator.

When the output of flip-flop BC changes to a logical "0", transistors TR1 to TR6 saturate and the ringing current is injected during a half-cycle, diodes D1 and D2 injecting the current during the other half-cycle. The static switch is thus bidirectional.

It is thus seen in FIG. 2B that ringing current half-cycles pass via the transistors or the diodes of the said static switch. As soon as the telephone set receiver is lifted (at D), a sudden voltage variation occurs on wires a and b (Sa and Sb) due to the sudden decrease in load resistance and to the resulting DC voltage change on wires a and b (changing from 0 V and −48 V to approximately −10 V and 38 V). This drop in load resistance also suddenly increases the current through the transistors of circuit CH. The voltage on a and b (Sa and Sb) is less than SA and SB due to the protective resistors R3 and R5 which also allow detection of the off-hook condition of the called telephone set.

It is seen that the use of currents less than those used in previous cases reduces the power dissipated in the resistors.

In the case of R4, for example, it is sufficient to provide a ¼ W resistor, whilst previously two resistors were used, each rated at 1 W. This results in considerable space saving and reduced heating.

As soon as voltage Sa reaches the reference voltage $V_{REF}$(FIG. 1), corresponding to automatic interruption of the ringing current, signal B/ resets flip-flop BC to zero and the injector cuts off, resulting in DC currents. For DC currents at 0 V and −48 V, the ringing current is preferably applied to SA and SB at an RMS voltage of 70 V.

We claim:

1. A telephone set line circuit ringing current injection device comprising a hybrid circuit having feeding terminals connected to a ringing current generator, and outputs connected to a subscriber's lines; said hybrid circuit comprises a pair of power transistors connected between said feeding terminals and said outputs; each power transistor including a diode connected across its collector-to-emitter path with the emitter being connected to the anode of the diode; and a resistor connected in series with the output of the power transistor and one of said outputs; a control flip-flop having an output coupled to the bases of said power transistors, said flip-flop having a clock input which is connected to a central unit for receiving a synchronization signal for validating a ringing order when the voltage on a subscriber's line is on hook or zero; said control flip-flop's clock input being connected to said central unit for receiving a ringing order, and said control flip-flop having a reset input connected to an output of a line loop detector for resetting said flip-flop when the receiver of the called telephone set is off hook.

2. A device according to claim 1, wherein said pair of power transistors are connected in a Darlington circuit with a third and a fourth transistor respectively, a base of said third transistor being directly connected to an emitter of a fifth transistor, and a base of said fourth transistor being connected through a resistor to a collector of said fifth transistor, a base of said fifth transistor being connected through a resistor to a collector of a sixth transistor an emitter of which is connected to a positive voltage and a base of which is connected to an anode of a diode a cathode of which is connected through a resistor to said output of said control flip-flop.

3. A device according to claim 2, wherein said line loop detector comprises a comparator a positive input of which is connected to a reference voltage, its negative input being connected to a conductor of said subscriber's line through a resistor, to a cathode of a first protective diode an anode of which is connected to a positive voltage, to an anode of a second protective diode a cathode of which is connected to a negative voltage, and to an eliminating interference capacitor, and wherein the output of said comparator is connected through a resistor to a base of a seventh transistor an emitter of which is grounded and a collector of which is connected to the input of said control flip-flop and to a positive voltage through a resistor.

* * * * *